United States Patent
Stoner et al.

(10) Patent No.: US 9,763,024 B2
(45) Date of Patent: Sep. 12, 2017

(54) MOBILE GHOSTING

(71) Applicant: Yahoo! Inc., Sunnyvale, CA (US)

(72) Inventors: Chris Stoner, San Jose, CA (US); Mike Chrabaszcz, Milpitas, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 0 days.

(21) Appl. No.: 14/682,751

(22) Filed: Apr. 9, 2015

(65) Prior Publication Data

US 2016/0302023 A1    Oct. 13, 2016

(51) Int. Cl.
*H04M 3/00* (2006.01)
*H04W 4/00* (2009.01)
*H04M 1/725* (2006.01)

(52) U.S. Cl.
CPC ....... *H04W 4/003* (2013.01); *H04M 1/72525* (2013.01); *H04W 4/001* (2013.01)

(58) Field of Classification Search
CPC ....... H04W 4/00; H04W 4/001; H04W 4/003; H04W 4/12; H04W 4/16; H04W 4/18; H04W 4/20; H04W 76/023; H04W 88/18
USPC .................. 455/418, 419, 420, 517
See application file for complete search history.

(56) References Cited

U.S. PATENT DOCUMENTS

| | | |
|---|---|---|
| 8,181,114 B2 | 5/2012 | Saka |
| RE44,248 E | 5/2013 | Poirier |
| 9,230,276 B2 * | 1/2016 | Mehta ............... G06Q 30/0282 |
| 2004/0070608 A1 | 4/2004 | Saka |
| 2005/0235029 A1* | 10/2005 | Hussmann .......... H04M 1/7253 709/200 |
| 2009/0119678 A1* | 5/2009 | Shih ...................... G06Q 10/10 719/313 |
| 2010/0248699 A1* | 9/2010 | Dumais ............... H04L 67/1095 455/414.1 |
| 2012/0036220 A1* | 2/2012 | Dare ........................ G06F 8/61 709/217 |
| 2012/0036552 A1* | 2/2012 | Dare ................... H04L 41/0253 726/1 |
| 2012/0240236 A1* | 9/2012 | Wyatt .................... G06F 21/564 726/25 |
| 2012/0272232 A1* | 10/2012 | Song ......................... G06F 8/61 717/178 |
| 2012/0303476 A1* | 11/2012 | Krzyzanowski .......... G06F 8/60 705/26.5 |
| 2013/0339498 A1* | 12/2013 | Johnson .................. H04W 4/02 709/221 |
| 2014/0075056 A1* | 3/2014 | Shin ........................ H04L 67/10 710/20 |

(Continued)

FOREIGN PATENT DOCUMENTS

WO    2007/073546 A2    6/2007

*Primary Examiner* — Jean Gelin
(74) *Attorney, Agent, or Firm* — Weaver Austin Villeneuve & Sampson LLP

(57) ABSTRACT

In one embodiment, a first set of applications installed on a first device is identified. Device characteristics of a second device may be ascertained. An application store for the second device may be determined based, at least in part, on the device characteristics of the second device. A second set of applications corresponding to the first set of applications is selected, where the second set of applications is available from the application store and compatible with the device characteristics of the second device.

20 Claims, 6 Drawing Sheets

(56) References Cited

U.S. PATENT DOCUMENTS

| | | | |
|---|---|---|---|
| 2015/0161024 A1* | 6/2015 | Gupta | G06F 11/3612 |
| | | | 714/47.3 |
| 2015/0201062 A1* | 7/2015 | Shih | H04M 1/72552 |
| | | | 455/564 |
| 2016/0062847 A1* | 3/2016 | Filippov | G06F 8/61 |
| | | | 707/640 |
| 2016/0197773 A1* | 7/2016 | Pandrangi | G06F 8/61 |
| | | | 709/217 |
| 2016/0274882 A1* | 9/2016 | Fazi | G06F 8/61 |

* cited by examiner

MOBILE GHOSTING

BACKGROUND

The disclosed embodiments relate generally to computer-implemented methods and apparatus for replicating applications installed on one mobile device or equivalent applications onto another mobile device.

A mobile application, most commonly referred to as an application or app, is a type of application software designed to run on a mobile device such as a smartphone or tablet computer. An app is typically a small, individual software unit that provides limited and isolated functionality such as a game, calculator, or mobile web browsing.

Due to the limited hardware resources of the early mobile devices, apps have traditionally provided limited functionality. However, the specificity of apps is now part of their desirability because this allows consumers to hand-pick the specific functions that their devices are able to perform.

Today, there are numerous mobile applications available for installation on mobile devices. Typically, users may select mobile applications available from an application store and install the selected mobile applications on their mobile devices. While some mobile applications can be installed without submitting a payment, others are for purchase for a nominal fee. Sometimes, applications may have further subscription fees that are paid periodically to receive services after the applications are installed.

SUMMARY

In one embodiment, a first set of applications installed on a first device is identified. Device characteristics of a second device may be ascertained. An application store for the second device may be determined based, at least in part, on the device characteristics of the second device. A second set of applications corresponding to the first set of applications is selected by a processor, where the second set of applications is available from the application store and compatible with the device characteristics of the second device.

In another embodiment, a device comprising a processor and a memory is configured to perform one or more of the above described method operations. In another embodiment, a computer readable storage medium having computer program instructions stored thereon are arranged to perform one or more of the above described method operations.

DETAILED DESCRIPTION OF THE SPECIFIC EMBODIMENTS

Figure 1:
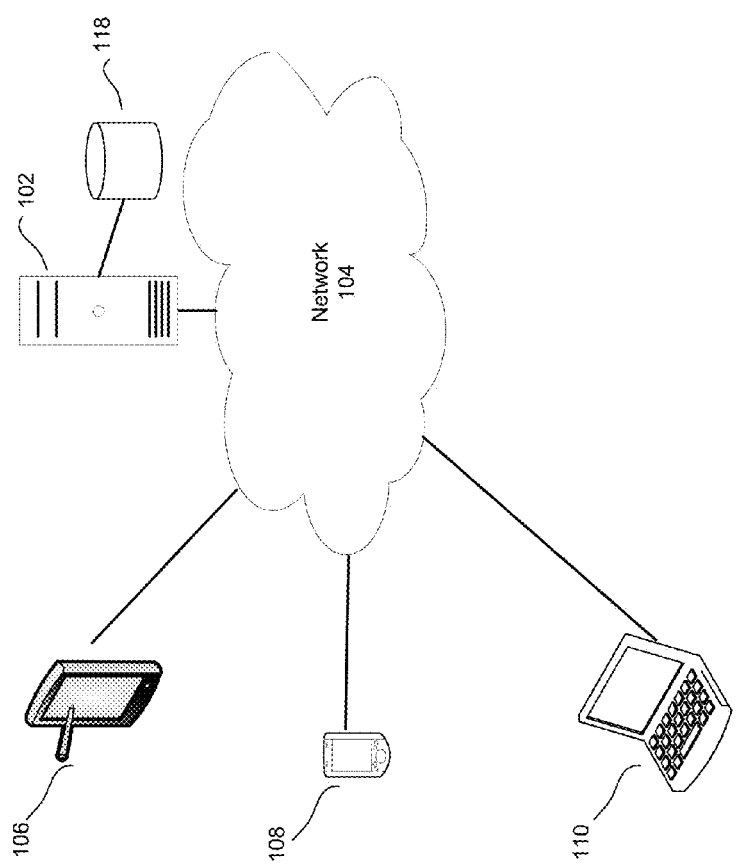
FIG. 1 is a diagram illustrating an example hierarchy of nodes in which various embodiments may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

A user may install any number of applications on a mobile device. Later, when the user purchases a new mobile device either as a replacement or additional mobile device, the user may wish to copy the previously purchased applications onto their new device. Where both devices are the same type of device (e.g., smartphone), are purchased from the same manufacturer, and have the same device operating system (and thereby the same application store), the same set of mobile applications installed on their first device can typically be identified and installed on their second device fairly easily. For example, where the user backed up the list of applications installed on their first device, these same applications may be installed on their second device. Unfortunately, where the devices are of different types or have different operating systems, the same applications that are installed on one of the devices often cannot be installed on the other one of the devices easily.

Since applications may be installed onto a mobile device over a significant period of time, the number of applications that are installed on a given mobile device may be significant. For a user to manually find, select, and download each application onto their new mobile device would be a time-consuming and tedious process.

The disclosed embodiments support the "mobile ghosting" (e.g., replicating) of applications installed on one mobile device or applications that are "functionally equivalent" onto another mobile device. The devices need not be of the same type nor have the same operating system. Examples of systems and methods for implementing the disclosed embodiments will be described in further detail below.

Example System

FIG. 1 is a diagram illustrating an example system in which various embodiments may be implemented. As shown in FIG. 1, the system may include one or more servers 102. For example, the servers 102 may be associated with a web site that provides a variety of services to its users. More particularly, the server(s) 102 may include a web server, search server, and/or content server. In addition, the server(s) 102 may provide "mobile ghosting" services, as will be described in further detail below.

In some embodiments, the server(s) 102 may provide services such as targeted content to users of the web site. A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on websites, in applications, or other places where users are more likely to see them, such as during an online session.

As shown in FIG. 1, a plurality of clients 106, 108, 110 may purchase products, or access/receive various services via the web site. More particularly, the services may include "mobile ghosting" services. In some embodiments, the services may also include the transmission of personalized content to the clients 106, 108, 110, email and/or other messaging services.

"Mobile ghosting" services may be provided to the clients 106, 108, 110 via applications implemented by the servers 102 and/or the clients 106, 108, 110. More particularly, a "mobile ghosting" application may be downloaded from application store(s) to the clients 106, 108, 110. For example, "mobile ghosting" services may be implemented by the servers 102, a source mobile device from which a first set of applications are to be "replicated," and/or a target mobile device for which a second set of "functionally equivalent" applications are to be identified, installed, and/or recommended for installation. In some embodiments, the clients 106, 108, 110 may access a web service, for example, on a web server via network 104 using a graphical user interface to select and install applications identified via the mobile ghosting process.

The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which various embodiments may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A system supporting "mobile ghosting" may be implemented on any number of servers although only a single server 102 is illustrated for clarity. Various embodiments disclosed herein may be implemented via the server 102 and/or the clients 106, 108, 110. For example, various features may be implemented via a web browser and/or application on the clients 106, 108, 110. The disclosed embodiments may be implemented via software and/or hardware.

Users that are members of the web site, access content or other services of the web site, or receive services such as personalized content or "mobile ghosting" services from the web site may have user accounts that are maintained by the system. In accordance with various embodiments, the server(s) 102 may have access to one or more databases into which account information is retained for each of a plurality of user accounts. The databases may be retained in one or more memories 118 that are coupled to the server 102.

The account information pertaining to a user account may include a user identifier. The user identifier may uniquely identify an account owner (e.g., user) within the system. For example, the user identifier may include a sequence of alphanumeric characters such as a social security number, a phone number, a family name (e.g., Chris Stoner), a username (e.g., Stoner408), or an email address. In accordance with various embodiments, the user identifier is a username that corresponds to an email address associated with the user account. In other embodiments, the user identifier may be determined using other mechanisms. For example, a user may be identified using biometric authentication methods such as a deoxyribonucleic acid (DNA), retina scan, finger print recognition, or facial recognition. As another example, a user may be identified using a possession factor device such as a universal serial bus (USB) security token, near field communication (NFC) device, or smart card.

In addition, the account information may include one or more passwords. More particularly, the passwords may include a system-generated password and/or user-specified password.

The account information may also include device information for one or more devices used in association with the account. For example, the device information may include a device identifier (e.g., Internet Protocol (IP) address or Media Access Control (MAC) address), device type (e.g., tablet, smartphone), device model (e.g., iphone, android), and/or operating system. The account information may also identify an application store from which applications may be downloaded and installed onto the corresponding one of the devices. In addition, the account information may also include a user identifier and password associated with a user account for the corresponding application store.

In addition, the account information may include "mobile ghosting" preferences of an owner of the device. For example, the preferences may indicate that applications that are identified via "mobile ghosting" services are to be automatically installed or are to be added to a queue in the application store for selection prior to installation. As another example, the preferences may indicate that those applications that are identified by "mobile ghosting" and are free to install are to be automatically downloaded, while those applications that are not free to install (or those that have associated subscription fees) are to be added to a queue in the application store for selection and installation by the user.

In some embodiments, the account information may further include personal information such as demographic information (e.g., birth date, age, occupation, and/or gender) and/or geographic information (e.g., residence address, work address, zip code, and/or area code). The account information may also include credit card information, enabling account owners to be charged for various products or services offered by the web site.

As will be described in further detail below, the disclosed embodiments may "replicate" a first set of applications installed on a first device by identifying a second set of applications that correspond to the first set of applications and are compatible with device characteristics of a second device. More particularly, the second set of applications may provide the same functionality as the first set of applications or functionality that is equivalent to that of the first set of applications. Specifically, an application in the second set of applications may provide the same functionality as a corresponding application in the first set of applications, or functionality that is considered equivalent to that provided by the corresponding application in the first set of applications. The functionality of an application may be determined based, at least in part, on a category associated with the application, permissions associated with the application, and/or language in which graphical user interfaces are provided by the application.

In some embodiments, mobile ghosting may be performed automatically. For example, mobile ghosting may be performed when a user turns on the second device, logs in to a user account associated with the web site, or logs in to an application store via the second device. In other embodiments, mobile ghosting may be performed in response to a request for configuration of the second device by a user. For example, the request for configuration may be submitted via a single action such as a mouse click or selection by a user of a button or icon via the web site.

In accordance with various embodiments, a graphical user interface may be presented to obtain configuration preferences from a user for use in configuration of the second device via "mobile ghosting" services. The configuration preferences may indicate whether applications are to be automatically downloaded to the second device. Similarly, the configuration preferences may indicate situations in which applications are to be automatically downloaded to the second device and/or situations in which applications are to be added to a queue for selection by the user. For example, the configuration preferences may indicate that applications that are free to download and have no associated subscription fees are to be automatically downloaded, while other applications that require payment are to be added to a queue for selection and installation by the user from an application store. As another example, the configuration preferences may indicate that where a single application is identified as being "functionally equivalent" and compatible with the device characteristics of the second device, the application is to be automatically downloaded. Therefore, a user may indicate whether he or she wishes the "mobile ghosting" service to install applications on the second device without specifically providing confirmation for each of the applications prior to such installation.

"Mobile ghosting" operations may be performed by the first device from which applications are to be "replicated," the second device for which the applications are to be "replicated," and/or a remotely located server. In some embodiments, the first device and second device may communicate regarding the applications to be replicated and/or the device characteristics of the second device. For example, the first device may transmit a list of the applications to be replicated to the second device. As another example, the second device may transmit its device characteristics to the first device. In other embodiments, a remotely located server may identify the applications to be replicated and/or the device characteristics of the second device via information stored in a cloud, communications with the first device, and/or communications with the second device.

In accordance with various embodiments, a trusted relationship between the first device and the second device may be established. For example, the trusted relationship may be established via a user identifier and password associated with a user account, where the user identifier and password are submitted by the user via the first device and the second device. Similarly, a server may access information pertaining to the first device and/or the second device using the user identifier and password. In some instances, the user may submit his or her user identifier and password to the server via a login process. The user identifier and password may be transmitted by the first device or the second device to the server automatically during mobile ghosting operations.

Figure 2:
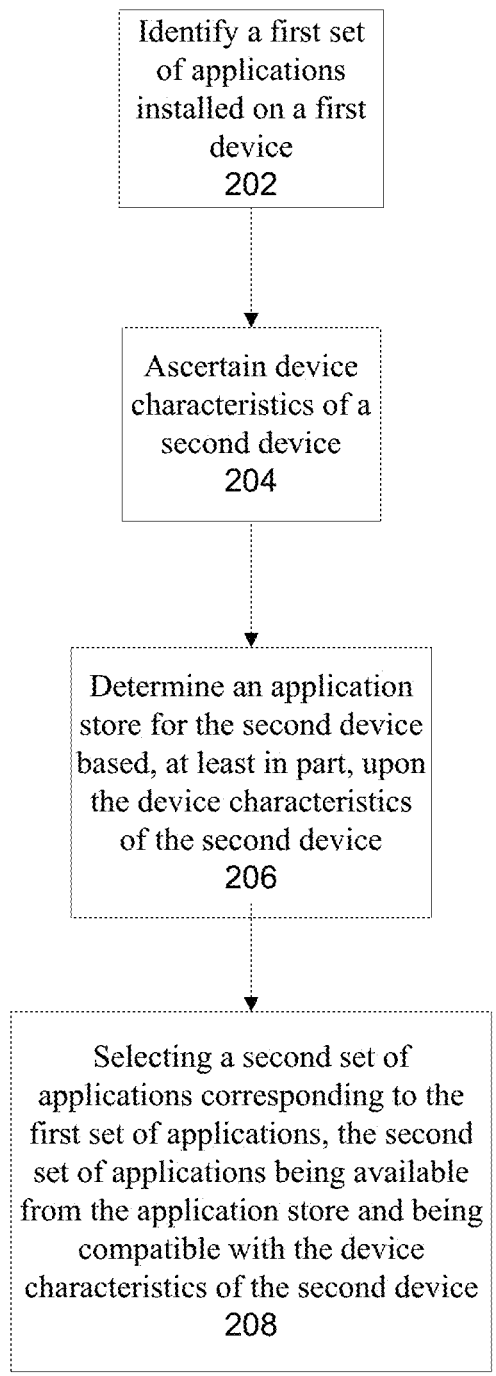
FIG. 2 is a process flow diagram illustrating an example method of performing mobile ghosting in accordance with various embodiments.

FIG. 2 is a process flow diagram illustrating an example method of performing mobile ghosting of mobile applications in accordance with various embodiments. A first set of applications installed on a first device from which applications are to be "replicated" may be identified at 202. The first device may have device characteristics including a device type (e.g., smartphone), a device model (e.g., iphone or android), and/or an operating system. More particularly, the operating system may include a name of the operating system, as well as a version of the operating system.

In some embodiments, the first set of applications may be identified by a server. For example, the server may identify the first set of applications from a cloud that maintains lists of applications installed on various mobile devices. In other embodiments, a list of the first set of applications may be published by the first device or provided upon receipt of a query for its installed applications (e.g., from a server or another mobile device). For example, the list of applications may be transmitted as a message by the first device to the server or to the second device.

Device characteristics of a second device for which the first set of applications are to be "replicated" may be ascertained at 204. For example, the device characteristics may include a device type, an operating system, and/or a device model. The device characteristics (e.g., device type, device model, and/or operating system) of the second device need not be identical to the device characteristics of the first device.

An application store for the second device may be ascertained at 206 based, at least in part, on the device characteristics of the second device. Different companies (e.g., device manufacturers and application vendors) may support different websites via which application stores may be accessed. The application store from which applications may be installed onto the second device may be ascertained based, at least in part, upon the device type (e.g., tablet, smartphone, etc.), device model, and/or operating system of the second device. The application store may be ascertained by a server or another device (e.g., the first or second device).

The application store may list a plurality of applications that are available for installation on various devices. In addition, for each of the applications, the application store may identify corresponding application characteristics. More particularly, the application characteristics may indicate at least one application category in which the application is categorized, device characteristics of compatible devices (e.g., compatible operating systems, device types, and/or device models), language, permissions, number of downloads performed from the application store, application ranking among applications available from the application store, and/or number of stars assigned by users to the application.

A second set of applications corresponding to the first set of applications may be selected by a processor at 208, where the second set of applications is available from the application store and compatible with the device characteristics of the second device. The second set of applications that is selected may offer functionality that is the same or functionally that is equivalent to the first set of applications. Stated another way, the second set of applications may include applications that offer the closest match to the functionally offered by the first set of applications. Selection of the second set of applications may be performed automatically and/or in response to a user detected action such as a request for configuration of the second device. The second set of applications may be selected by a server and/or another device (e.g., the first or second device).

In some instances, the second set of applications may include, for each application in the first set of applications, at least one application. In other instances, it is possible that, for a particular application in the first set of applications, a functionally equivalent application that is compatible with the device characteristics of the second device cannot be identified. Therefore, the second set of applications may not include a counterpart for each application in the first set of applications.

The second set of applications may be selected directly from the application store and/or a mapping table (or portion thereof). For example, a server may query application store(s) to generate and maintain a mapping table, which maps applications that are considered functionally equivalent (e.g., within the same application category) for use by devices having various different device characteristics. More particularly, the mapping table may identify sets of applications, where each set of applications includes applications that are considered to be functionally equivalent applications in terms application functionality (e.g., application category, language, etc.). The mapping table may indicate, for each application, corresponding application characteristics and the application store(s) from which the application can be installed. In some embodiments, the server may provide the mapping table or a portion thereof to devices, either automatically or upon request from such devices. For example, a portion of the mapping table that identifies applications available from the application store that are compatible with the second device may be transmitted periodically to the second device. An example method of selecting the second set of applications will be described in further detail below with reference to FIG. 3.

Figure 3:
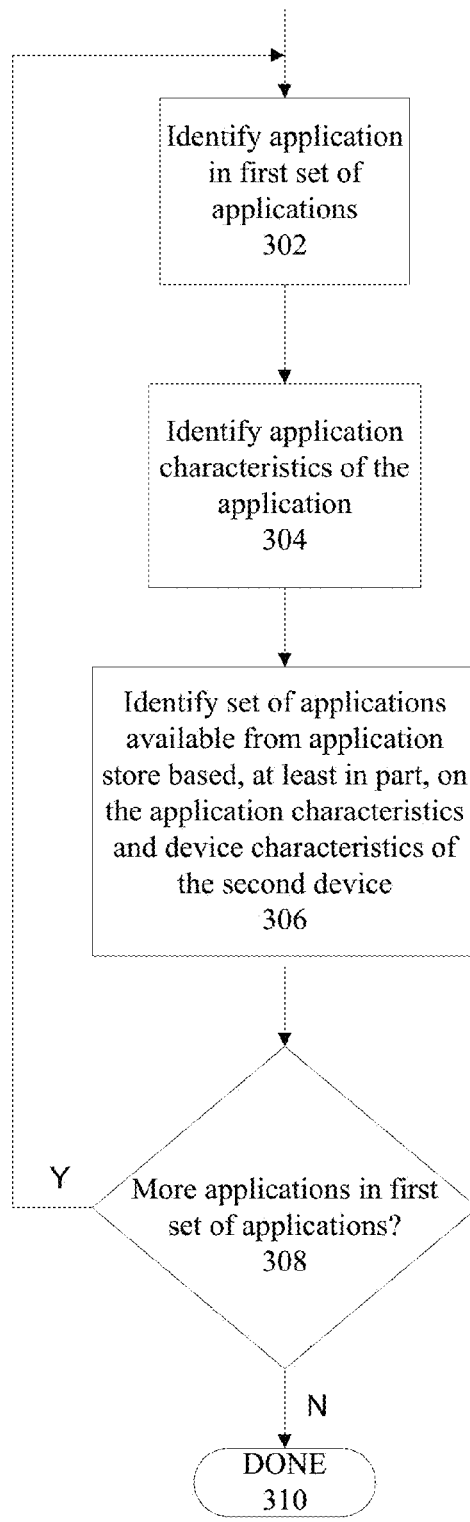
FIG. 3 is a process flow diagram illustrating an example method of selecting a second set of applications corresponding to a first set of applications as shown at 208 of FIG. 2.

FIG. 3 is a process flow diagram illustrating an example method of selecting a second set of applications compatible with the second device as shown at 208, where the second set of applications corresponds to the first set of applications installed on a first device. As shown in FIG. 3, an application in the first set of applications may be identified at 302.

Application characteristics of the application may be identified at 304. More particularly, the application characteristics of the application may include a category in which the application has been categorized. For example, the application category may be electronic mail, scheduling, instant messaging, or games.

In some embodiments, the application characteristics associated with the application in the first set of applications may include a set of permissions. For example, the permissions may permit or deny access to contacts maintained in a mobile device. Further application characteristics may include a language in which graphical user interfaces of the application are presented.

A set of applications available from the application store may be identified at 306 based, at least in part, on the corresponding application characteristics (e.g., of the application in the first set and applications available from the application store) and the device characteristics of the second device. For example, the application characteristics may include at least one application category in which the application is categorized, compatible operating systems, compatible device types, compatible device models, permissions, language(s), number of downloads, application ranking, and/or number of stars.

Each application in the set of applications may be "functionally equivalent" to the application in the first set of applications and compatible with the device characteristics of the second device. For example, a functionally equivalent application may be categorized in the same category, provide graphical user interfaces in the same language, and/or provide the same permissions as the application in the first set of applications.

The set of applications that is functionally equivalent to (e.g., mapped to) the application in the first set of applications may include zero or more applications. More particularly, in some instances, a one-to-one mapping between the application in the first set of applications and a "functionally equivalent" application compatible with the device characteristics of the second device may be identified. In other instances, the set of applications that are compatible with the device characteristics of the second device and considered functionally equivalent substitutes for the application installed on the first device may include two or more applications. In yet other instances, there may be no applications that are considered to be compatible with the device characteristics of the second device and also functionally equivalent to the application installed on the first device.

Where two or more applications have been identified as possible functional counterparts of an application installed on the first device, one of the applications may be automatically selected based, at least in part, upon the corresponding application characteristics (of the application installed on the first device and/or applications available from the application store) and the device characteristics of the second device. For example, such automatic selection may be performed based, at least in part, on application rankings, number of stars, and/or number of downloads of the applications. In this manner, it is possible to automatically select an application that is compatible with the second device and is most likely to satisfy the user of the second device.

The process may continue at 308 for each remaining application in the first set of applications until the process ends at 310.

In accordance with various embodiments, the user of the second device may be prompted (e.g., by the ghosting service or application store) to install the second set of applications or a portion thereof. More particularly, the second set of applications or a portion thereof may be added to a queue for selection and downloading by the user. Thus, the second set of applications or a portion thereof may be presented via a graphical user interface for selection by a user. For example, two or more applications that have been identified as possible functional counterparts of an application installed on the first device may be presented for selection via a graphical user interface. Downloading of one of the two or more applications onto the second device may be initiated in response to receiving a selection of the one of the two or more applications via the graphical user interface.

In some embodiments, at least a portion of the second set of applications may be downloaded to the second device from the application store automatically without human intervention. For example, automatic downloading may be performed when the second device is turned on, when the user logs in to an account via the web site, or when the user logs in to an account of an application store via the second device. Automatic downloading may be desirable in situations such as where a single application that is compatible with the device characteristics of the second device and available from the application store is identified as being mapped to (e.g., functionally equivalent to) an application in the first set of applications, the application in the second set of applications is free to download and/or where the application in the second set of applications has no associated subscription fees.

In accordance with various embodiments, notification(s) including device characteristics of the first device, device characteristics of the second device, information pertaining to the first set of applications or portion thereof, and/or information pertaining to the second set of applications or a portion thereof may be transmitted to one or more application providers. For example, the information may identify applications, as well as characteristics of each of the identified applications. The providers may receive the notifications automatically or upon selection and downloading by a user of an identified application from an application store.

In some embodiments, application providers may ascertain from a referring uniform resource locator (URL) that a mobile ghosting service or an application store is providing the notifications. Using the information provided in the notifications, the application providers may ascertain whether their application(s) are identified in the notifications and, if not, whether any of their applications should have been identified by the mobile ghosting service. The application providers may contact the mobile ghosting service to update its mapping table accordingly.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 4:
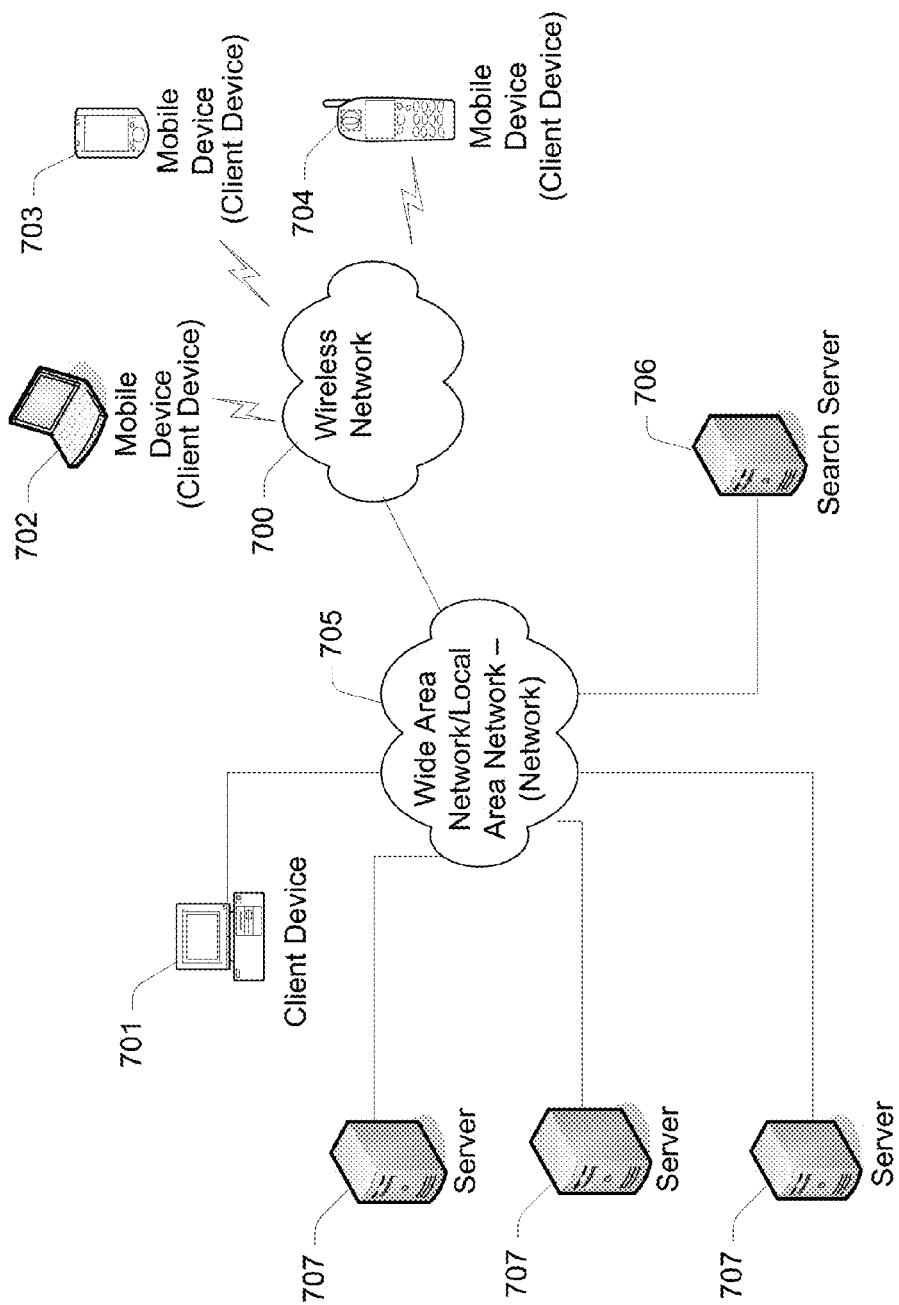
FIG. 4 is a schematic diagram illustrating an example embodiment of a network in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

Figure 5:
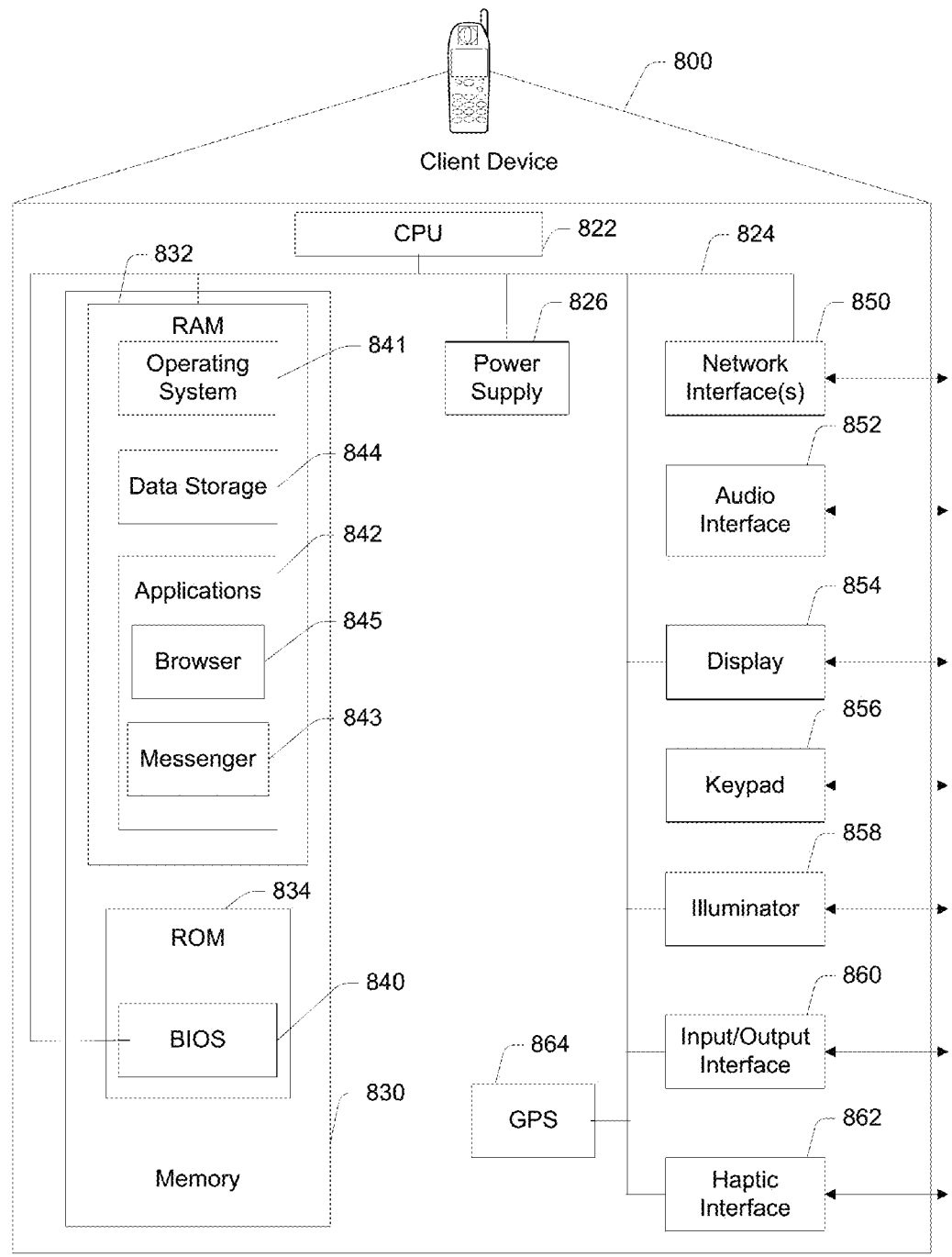
FIG. 5 is a schematic diagram illustrating an example client device in which various embodiments may be implemented.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 6:
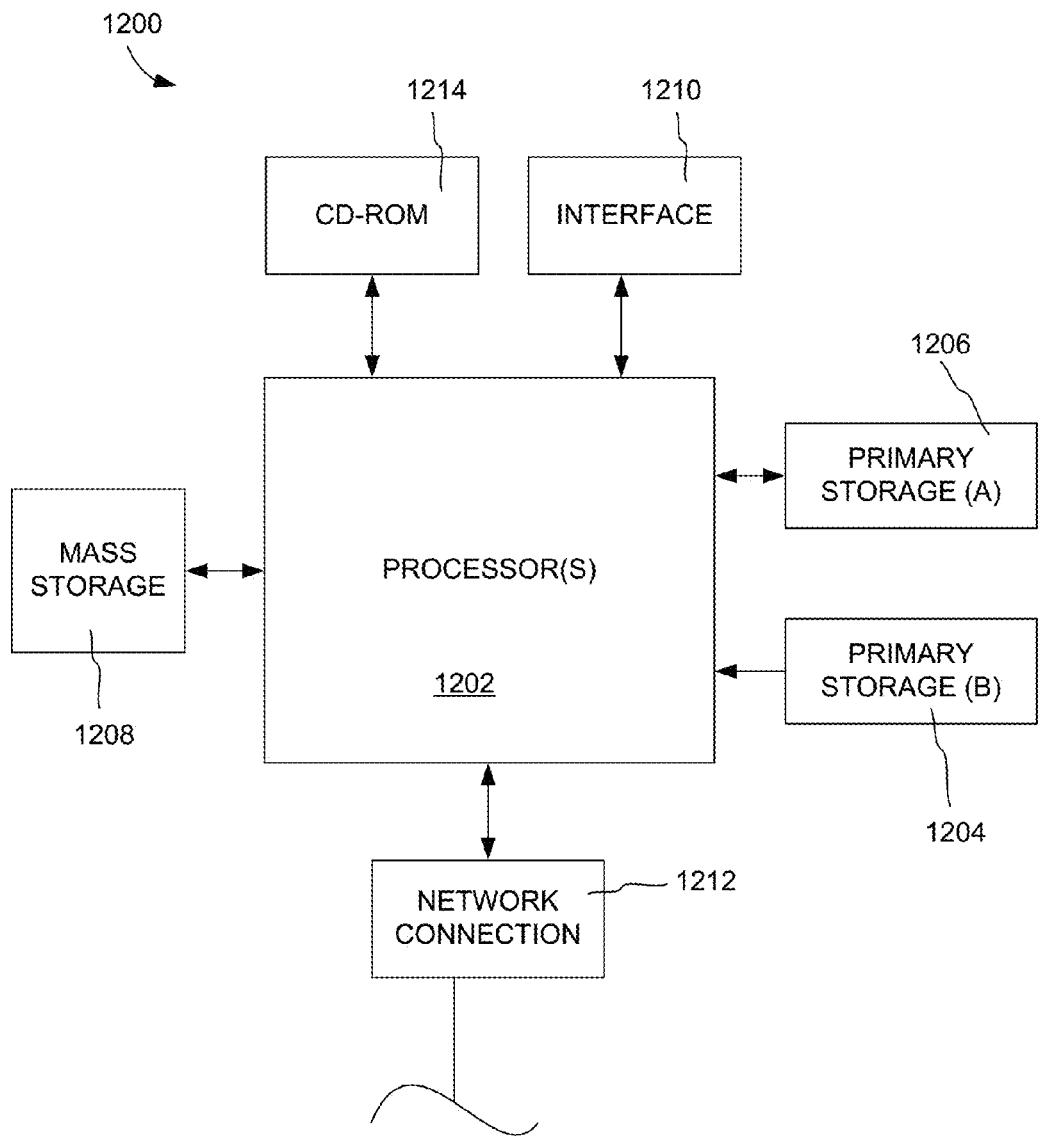
FIG. 6 is a schematic diagram illustrating an example computer system in which various embodiments may be implemented.

FIG. 6 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may include a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the embodiments are not to be limited to the details given herein, but may be modified within the scope and equivalents of the appended claims.

What is claimed is:

1. A method, comprising:
   identifying a first set of applications installed on a first device;
   ascertaining device characteristics of a second device;
   determining an application store for the second device based, at least in part, on the device characteristics of the second device; and
   selecting, by a processor, a second set of applications corresponding to the first set of applications, the second set of applications being available from the application store and being compatible with the device characteristics of the second device; and
   downloading the second set of applications according to configuration preferences, the configuration preferences indicating a first set of preferences for applications that are free to download from the application store and a second set of preferences for applications that are not free to download from the application store.

2. The method as recited in claim 1, further comprising identifying an application category of an application in the first set of applications, wherein selecting the second set of applications comprises:
   identifying at least one application available from the application store that is categorized in the same application category and compatible with the device characteristics of the second device based, at least in part, on the corresponding application characteristics and the device characteristics of the second device, wherein the application characteristics include one or more of: at least one application category in which the application is categorized, number of downloads, application ranking, or number of stars.

3. The method as recited in claim 2, wherein the at least one application includes two or more applications, wherein selecting the second set of applications further comprises:
   automatically selecting one of the two or more applications based, at least in part, upon the corresponding application characteristics and the device characteristics of the second device.

4. The method as recited in claim 1, further comprising:
   present at least a portion of the second set of applications for selection via a graphical user interface; and
   initiate downloading of an application in the second set of applications in response to receiving a selection of the application via the graphical user interface.

5. The method as recited in claim 1, further comprising:
   automatically initiating downloading of at least a portion of the second set of applications from the application store.

6. The method as recited in claim 1, further comprising:
   adding at least a portion of the second set of applications to a queue of the application store.

7. The method as recited in claim 1, wherein the identifying, ascertaining, and selecting are performed by at least one of: the first device, the second device, or a server.

8. The method as recited in claim 1, wherein the device characteristics of the second device are not identical to the device characteristics of the first device.

9. The method as recited in claim 1, further comprising:
   instructions for detecting at least one of: a user has turned on the second device, logged in to a user account, or logged in to an application store via the second device.

10. An apparatus, comprising:
    a processor; and
    a memory, at least one of the processor or the memory being configured to:
    identify a first set of applications installed on a first device;
    ascertain device characteristics of a second device;
    determine an application store for the second device based, at least in part, on the device characteristics of the second device;
    select, by a processor, a second set of applications corresponding to the first set of applications, the second set of applications being available from the application store and being compatible with the device characteristics of the second device;
    automatically downloading a first subset of the second set of applications, the first subset of the second set of applications being free to download from the application store; and
    adding a second subset of the second set of applications to a queue of the application store, the second subset of the second set of applications not being free to download from the application store.

11. The apparatus as recited in claim 10, wherein the apparatus comprises a mobile device or a server.

12. The apparatus as recited in claim 10, at least one of the processor or the memory being further configured to identify an application category of an application in the first set of applications, wherein selecting the second set of applications comprises:
   identifying at least one application available from the application store that is categorized in the same application category and compatible with the device characteristics of the second device based, at least in part, on the corresponding application characteristics and the device characteristics of the second device, wherein the application characteristics include one or more of: at least one application category in which the application is categorized, compatible operating systems, compatible device types, compatible device models, number of downloads, application ranking, or number of stars.

13. The apparatus as recited in claim 12, wherein the at least one application includes two or more applications, wherein selecting the second set of applications further comprises:
    automatically selecting one of the two or more applications based, at least in part, upon the corresponding application characteristics and the device characteristics of the second device.

14. The apparatus as recited in claim 10, at least one of the processor or the memory being further configured to:
    present at least a portion of the second set of applications for selection via a graphical user interface; and
    initiate downloading of an application in the second set of applications in response to receiving a selection of the application via the graphical user interface.

15. The apparatus as recited in claim 10, at least one of the processor or the memory being further configured to:
    automatically initiate downloading of at least a portion of the second set of applications from the application store.

16. The apparatus as recited in claim 10, at least one of the processor or the memory being further configured to:
    add at least a portion of the second set of applications to a queue of the application store.

17. The apparatus as recited in claim 10, wherein the device characteristics of the second device are not identical to the device characteristics of the first device.

18. A non-transitory computer-readable storage medium storing thereon computer-readable instructions, comprising:
    instructions for identifying a first set of applications installed on a first device;
    instructions for ascertaining device characteristics of a second device
    instructions for determining an application store for the second device based, at least in part, on the device characteristics of the second device;
    instructions for selecting, by a processor, a second set of applications corresponding to the first set of applications, the second set of applications being available from the application store and being compatible with the device characteristics of the second device; and
    presenting at least a portion of the second set of applications for selection via a graphical user interface or adding at least a portion of the second set of applications to a queue of the application store.

19. The non-transitory computer-readable storage medium as recited in claim 18, further comprising:
    instructions for identifying an application category of an application in the first set of applications, wherein selecting the second set of applications comprises:
    instructions for identifying at least one application available from the application store that is categorized in the same application category and compatible with the device characteristics of the second device based, at least in part, on the corresponding application characteristics and the device characteristics of the second device, wherein the application characteristics include one or more of: at least one application category in which the application is categorized, compatible operating systems, compatible device types, compatible device models, number of downloads, application ranking, or number of stars.

20. The non-transitory computer-readable storage medium as recited in claim 18, wherein the device characteristics of the second device are different from the device characteristics of the first device.

* * * * *